United States Patent
Olsen et al.

[11] Patent Number: 6,094,200
[45] Date of Patent: Jul. 25, 2000

[54] SYSTEM AND METHOD FOR ACCELERATED OCCLUSION CULLING

[75] Inventors: Daniel M. Olsen; Noel D. Scott; Robert J. Casey, all of Fort Collins, Colo.

[73] Assignee: Hewlett-Packard Company, Palo Alto, Calif.

[21] Appl. No.: 09/020,189

[22] Filed: Feb. 6, 1998

[51] Int. Cl.[7] .................................................. G06T 15/40
[52] U.S. Cl. .......................................................... 345/422
[58] Field of Search .................................. 345/418, 419, 345/420, 421, 422, 428, 429

[56] References Cited

U.S. PATENT DOCUMENTS

| | | | |
|---|---|---|---|
| 5,245,700 | 9/1993 | Fossum | 395/122 |
| 5,542,025 | 7/1996 | Brown | 395/122 |
| 5,557,711 | 9/1996 | Malzbender | 395/122 |
| 5,561,750 | 10/1996 | Lentz | 395/122 |
| 5,583,974 | 12/1996 | Winner et al. | 395/122 |
| 5,590,249 | 12/1996 | Hanaoka | 395/122 |
| 5,613,050 | 3/1997 | Hochmuth et al. | 395/122 |

FOREIGN PATENT DOCUMENTS

| | | |
|---|---|---|
| 0255544A1 | 2/1988 | European Pat. Off. . |
| 0606685A1 | 7/1994 | European Pat. Off. . |

OTHER PUBLICATIONS

"Computer Graphic Principles and Practice", Second Edition, authors: James D. Foley, Andries van Dam, Steven K. Feiner, John F. Hughes; Addison–Wesley Publishing Company, Copyright 1990; pp. 660–663.

*Primary Examiner*—Phu K. Nguyen
*Assistant Examiner*—Cliff N. Vo

[57] ABSTRACT

An occlusion culling circuit for use in a graphics computer receives graphics primitives data including x and y coordinates for each pixel, a z depth value, and r, g, b, and a or index color data. For each group of primitives, the graphics computer scans the primitive and determines a volume which completely bounds the primitive. The z depth values for the pixels comprising the bounding volume are then compared by the occlusion culling circuit to the depths of the pixels in the already rendered primitives to determine whether any pixels in the incoming primitive are visible. If no pixels are visible, the occlusion culling circuit clears the result register and receives the next graphics primitive. If, on the other hand, one or more pixels is visible, the occlusion culling circuit completely renders the primitives bounded by the bounding volume. Since the graphics primitives which are totally occluded can bypass the more intensive pixel by pixel processing and storage, the speed and efficiency of the graphics computer can be significantly increased.

17 Claims, 4 Drawing Sheets

SYSTEM AND METHOD FOR ACCELERATED OCCLUSION CULLING

BACKGROUND OF THE INVENTION

1. Field of the Invention

The present invention generally relates to a system and method for occlusion culling and, more particularly, to a system and method for accelerating occlusion culling in a graphics computer.

2. Description of the Prior Art

A graphics computer is commonly used to display three-dimensional representations of an object on a two-dimensional display screen. In a typical graphics computer, an object to be rendered is divided into a plurality of graphics primitives. The graphics primitives are basic components of a graphics picture and may be defined by geometries of a point, line, vector, or polygon, such as a triangle. The graphics primitives are fed through a graphics pipeline where various types of processing occur and are then rendered on a display.

An example of a typical graphics pipeline 10 is shown in FIG. 1 and comprises a transform unit 12 for converting input primitive data from one coordinate space to another coordinate space. A light/shade unit 13 applies lighting and flat or smooth shading to the transformed graphics primitives and may additionally provide texture mapping capability to the graphics computer. A clip unit 14 clips primitives to a viewing volume and may further clip the primitives relative to one or more arbitrary clipping planes. At the clip unit 14, the primitive data is modified so that only that portion of the primitive which is inside the viewing volume becomes visible. A perspective divide unit 15 divides all coordinates by w to transform the data from homogeneous to three-dimensional coordinates. To provide perspective projection, the coordinates are further divided at the perspective divide unit 15 by the depth component so that objects farther away appear smaller. At a scan conversion unit 16, vertex coordinates and attributes are converted into pixel colors and depths. The data output from the graphics pipeline 10 includes such things as pixel coordinates or address x and y, pixel depth z, and color r, g, b, and a or color index. It should be understood that the graphics pipeline 10 is only exemplary of the operations performed by a typical graphics computer and that the operations of a particular graphics computer may vary from that described.

The output of the graphics pipeline 10 is typically routed to a frame buffer which comprises a color buffer and a depth buffer. A controller associated with the frame buffer compares the incoming pixel data to the pixel data displayed and controls the storage of the incoming pixel data accordingly. More precisely, the depth component z for each incoming pixel is compared to the depth component z for the pixel currently being displayed at the same x and y address. If the incoming pixel data at that address passes the depth test against the currently displayed pixel data, then the controller will enable the color buffer and depth buffer to store the data for that incoming pixel. The comparison of the current depth and the incoming depth is made for each pixel so that the data associated with the occluded pixels is not stored in the color and depth buffers.

The conventional graphics computer suffers from a disadvantage that it is relatively slow. In the frame buffer, each pixel in a primitive must have its z depth value compared to the depth value for the currently displayed pixel. Since each primitive may have thousands of pixels, a relatively large amount of processing time is expended to determine the visible pixels and to store the depth and color data associated with those pixels. It is therefore a desire in the industry to increase the speed of a graphics computer.

The speed of the graphics computer is also severely impeded since not all of the primitives are ultimately rendered. For instance, in an example of an automobile, the automobile may have a hierarchical data structure with different groupings for such things as body panels, the engine, drive train, interior, electrical, wheels, etc. Some of these data structures, such as the engine, may be quite complex and potentially may be comprised of thousands or millions of graphical primitives which are grouped together and rendered together. If the automobile is displayed from the top with the hood closed, a typical graphics computer may expend a large amount of time processing the multitude of primitives for the engine with the end result being that not a single primitive for the engine is displayed. Similarly, other portions of the automobile, such as the wheels or drive train, may also be entirely occluded. The amount of time expended processing all of these occluded primitives greatly decreases the speed and efficiency of the graphics computer. A need therefore exists for a graphics computer which can quickly render a large number of graphics primitives.

SUMMARY OF THE INVENTION

An object of the present invention is to provide a system and method for use in a graphics computer which can more quickly render and display graphics primitives.

Another object of the present invention is to provide a system and method which can reduce processing time by determining whether a graphics primitive is completely occluded.

Additional objects, advantages, and novel features of the invention will be set forth in the description which follows, and will become apparent to those skilled in the art upon reading this description or practicing the invention.

To achieve the foregoing and other objects, an occlusion culling circuit for use in a graphics computer and in accordance with a preferred embodiment of the invention comprises a central processor, a depth comparison circuit, a logic circuit, a depth buffer, and a color buffer. The central processor provides the graphics primitives that are to be rendered and manages certain operations of the occlusion culling circuit. The depth comparison circuit is configured to receive a graphics primitive from the central processor and to compare an incoming depth value for each address in the graphics primitive with a current depth value for a rendered pixel at a corresponding address. Based upon the comparison, the depth comparison circuit generates a result signal having a first logical value when the incoming depth value is visible and a second logical value when the incoming depth value is occluded by the rendered pixel. The logic circuit is configured to receive the result signal of the depth comparison circuit and to generate a depth compare signal. The logic circuit will latch the depth compare signal at the first logical value upon receipt of a result signal having the first logical value. If the first logic level is not latched by the logic circuit after processing a set of graphics primitives, then this indicates that all the primitives of that group are completely occluded by previously rendered primitives. Lastly, the depth buffer is provided for storing depth values of the graphics primitive and the color buffer is provided for storing color values of the graphics primitive.

Accordingly, the central processor stores color values and depth values of a pixel if the logic circuit latches the first logical value for pixel. On the other hand, the central processor does not store the depth values in the depth buffer or the color values in the color buffer if the logic circuit fails to latch the first logical value for the pixel since, in this case, the pixel is occluded.

BRIEF DESCRIPTION OF THE DRAWINGS

The accompanying drawings, which are incorporated in, and form a part of, the specification, illustrate a preferred embodiment of the present invention and, together with the description, serve to explain the principles of the invention. The drawings are not necessarily to scale, emphasis instead being placed upon clearly illustrating the principles of the invention. In the drawings.

DETAILED DESCRIPTION OF THE PREFERRED EMBODIMENT

Figure 2:
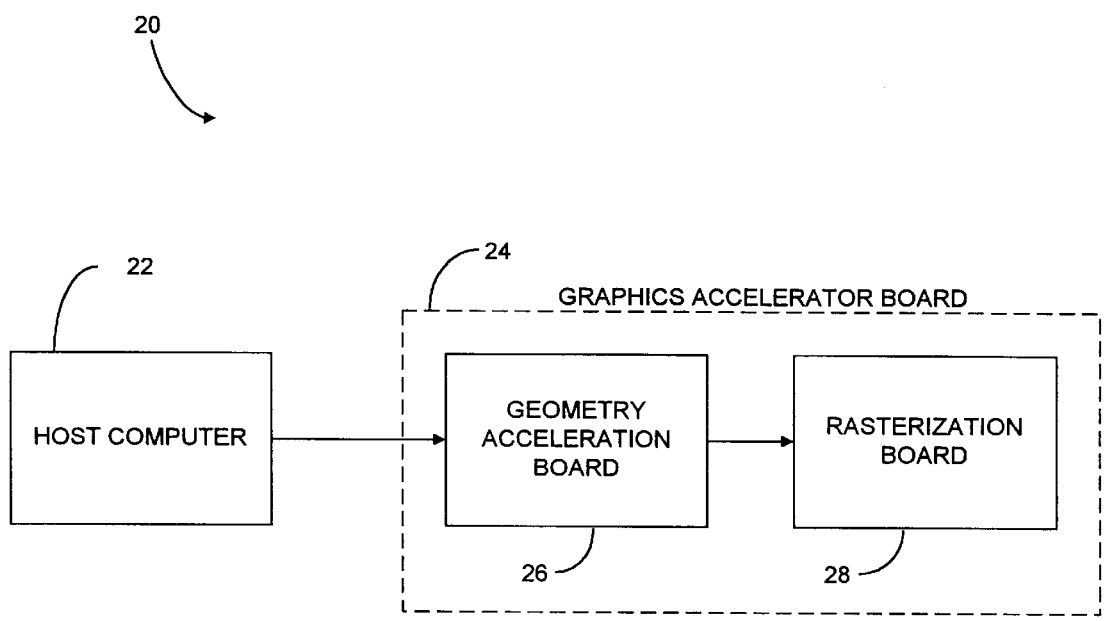
FIG. 2 is a block diagram of a graphics computer.

Reference will now be made in detail to the preferred embodiment of the invention. With reference to FIG. 2, a graphics computer 20 according to a preferred embodiment of the invention comprises a host computer 22 connected to a graphics accelerator board 24. The host computer 22 provides the graphics accelerator board 24 with graphics primitives and, as will be apparent from the description below, also controls certain operations within the graphics accelerator board 24.

Figure 1:
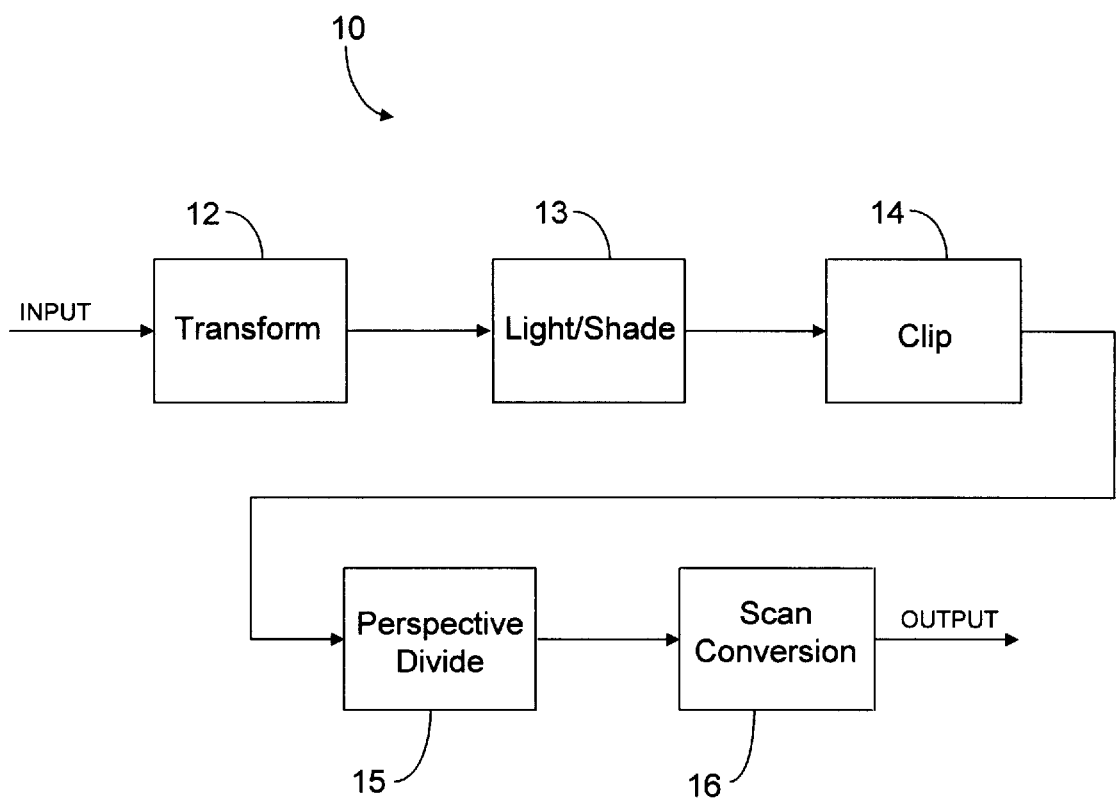
FIG. 1 is a block diagram of a graphics pipeline.

The graphics accelerator board 24 performs the functions of a typical graphics pipeline, such as the graphics pipeline 10 in FIG. 1, and generally comprises a geometry accelerator board 26 and a rasterization board 28. The operation of the geometry acceleration board 26 does not form any part of the present invention and any suitable geometry acceleration board 26 may be employed. The rasterization board 28 includes a frame buffer which comprises both a color buffer and a depth buffer. The rasterization board 28 performs the function of converting graphics primitives to individual pixels for display on a display device. This process is known in the industry as scan conversion or rasterization. It should be understood that the graphics computer 20 is not limited to the example shown in the drawing but may additionally comprise other elements, such as a texture mapping board.

Figure 3:
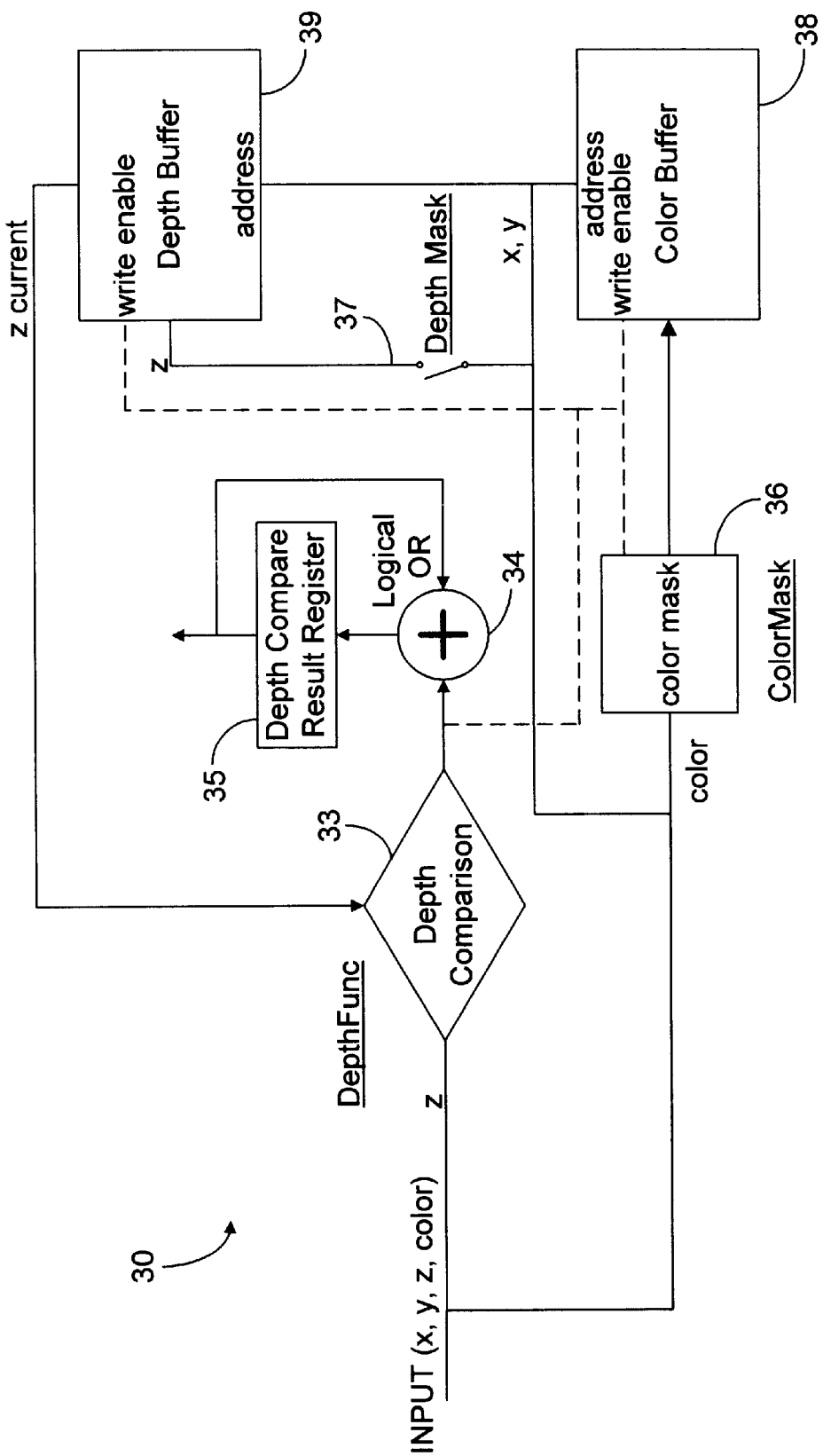
FIG. 3 is a schematic diagram of an occlusion culling circuit according to a preferred embodiment of the invention.

An occlusion culling circuit 30 according to a preferred embodiment of the invention is shown in FIG. 3. In general, the occlusion culling circuit 30 receives pixel data including pixel coordinates x and y, depth values z, and color data r, b, g, and a or color index and, for those pixels which are not completely occluded, stores the depth values z in a depth buffer 39 and stores the color data r, b, g, and a or color index in a color buffer 38.

More specifically, the input data is routed to a depth comparison circuit 33. The depth comparison circuit 33 compares the z value of the incoming pixel data to the current z pixel value stored in the depth buffer 39. The output of the depth comparison circuit 33 is a logical value of 1 if the incoming z pixel value passes the depth comparison against the current z pixel value and is otherwise a logical value of 0. The output of the depth comparison circuit 33 is routed to one input of an OR circuit 34 with the output of the OR circuit 34 being stored in a depth compare result register 35. The value stored in the depth compare result register 35 is routed back into a second input of the OR circuit 34.

The input pixel data is also supplied to a color mask 36 and to both the depth buffer 39 and the color buffer 38. The x and y coordinates of the incoming pixel data are supplied to an address input of both the depth buffer 39 and the color buffer 38. When a depth mask switch 37 is closed, the z values for the incoming pixel data are supplied to the depth buffer 39. Similarly, when the color mask circuit 36 is enabled, the color data is supplied to an input of the color buffer 38. Worth noting at this point is that the color mask circuit 36 can independently enable or disable any or all of the color r, g, b, and a or color index data that is supplied as an input to the color buffer 38.

A control line extends from the output of the depth comparison circuit 33 to the write enable inputs of the depth buffer 39 and the color buffer 38. When the output of the depth comparison circuit 33 is a logical value of 1, the logical 1 is supplied to the write enable inputs of the depth buffer 39 and color buffer 38 so as to enable a writing of data into the color and depth buffers 38 and 39. When the output of the depth comparison circuit 33 is a logical value of 0, the write enables of the depth buffer 39 and color buffer 38 remain disabled.

The circuit 30 can be operated, for example, in an OpenGL® interface whereby software commands are used in a known manner to close or open hardware switches by setting or clearing specific bits. As shown in FIG. 3, the circuit 30 employs an interface command of DepthMask to control the position of the switch 37, and thus to control the writing of z pixel data into the depth buffer 39, and an interface command of ColorMask to control the writing of color data into the color buffer 38. The circuit 30 additionally has an interface command of DepthFunc which controls the mode of operation for the depth comparison circuit 33. While the circuit 33 typically compares the incoming z pixel data to the current z pixel data using a function that is true if the incoming z pixel data is in front of the current z pixel data, the DepthFunc can alter the comparison to perform functions such as "behind", "equal to", "never pass", "always pass", etc. In fact, many more functions exist for DepthFunc that would be suitable for employing in the present invention. Further, it should be understood that the invention is not limited to this particular software implementation but, as will be apparent to those skilled in the art, may be implemented in other software or in hardware.

The occlusion culling circuit 30 is preferably implemented in a combination of hardware and software. Some features of the circuit 30, on the other hand, are preferably implemented in hardware. For instance, the logical OR circuit 34 comprises a semiconductor circuit, the depth compare result register 35 comprises a semiconductor register, and the depth and color buffers 39 and 38 comprise conventional depth and color buffer memory circuits. It should be understood that not all of these components need to be implemented in hardware but may alternatively be implemented in software.

Figure 4:
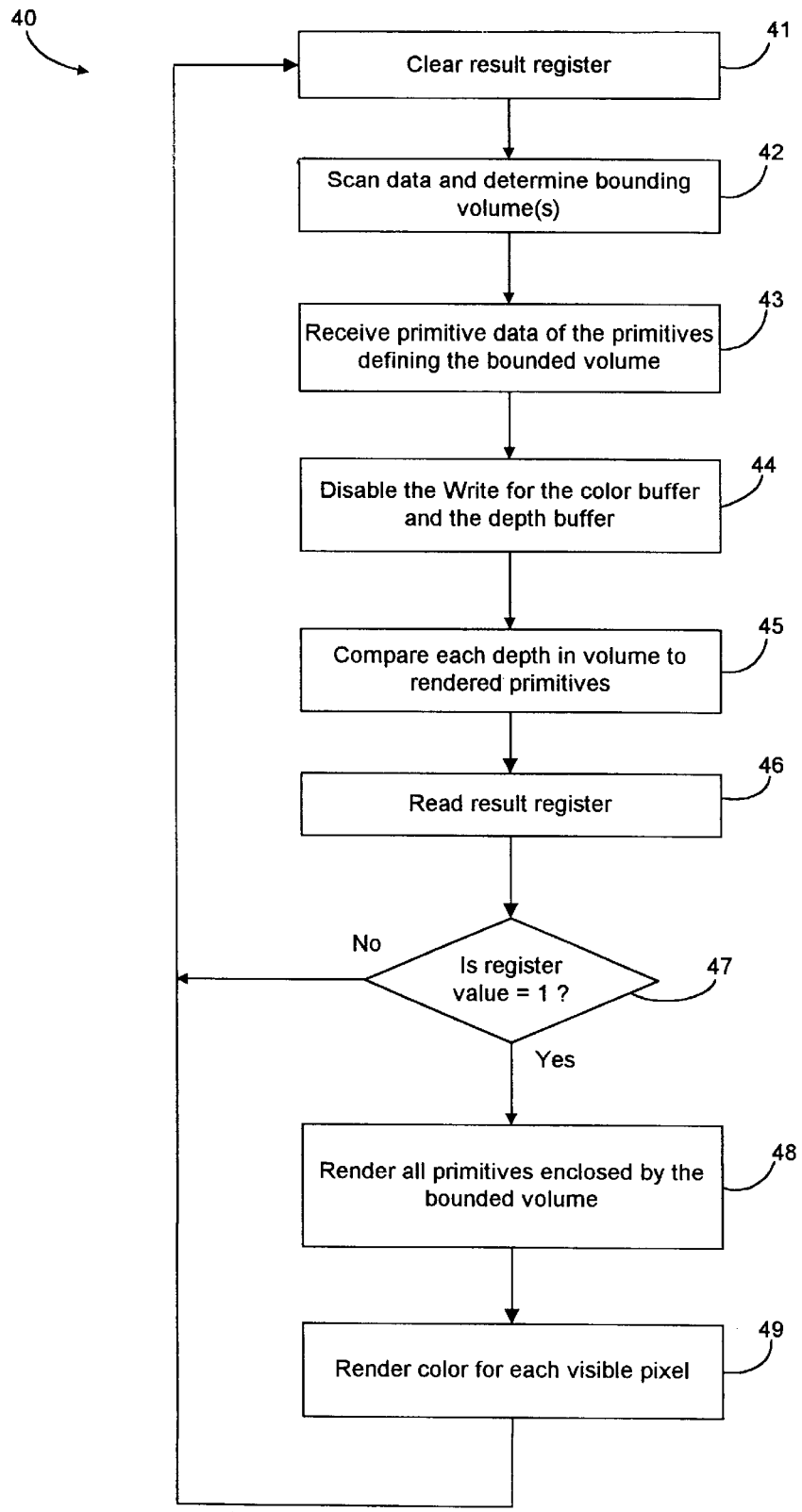
FIG. 4 is a flow chart of a method for occlusion culling according to a preferred embodiment of the invention.

An operation of the occlusion culling circuit 30 will now be described with reference to a flow chart 40 shown in FIG. 4. At a step 41, the depth compare result register 35 is cleared so that it stores a logical value of 0. The host computer 22, at step 42, scans the graphics primitive data of an object to be rendered and determines a bounding volume for the object that comprises graphics primitives that enclose the object. The manner in which the host computer 22 determines the bounding volume does not form any part of the present invention and any possible manner may be used. For instance, the host computer 22 may scan the graphics primitive data for the maximum and minimum values along the x-axis, the maximum and minimum values along the y-axis, and the maximum and minimum values along the z-axis. These six values can then be used to form a cube which completely encloses the graphics primitive. Since a cube may not be the minimal bounding volume, the host computer 22 may alternatively employ a bounding volume having another shape or defined by more than one shape.

Next, at step 43, the graphics primitive data of the primitives that define the bounded volume is inputted to the occlusion culling circuit 30 from the host computer 22. In step 44, the write for both the color buffer 38 and the depth buffer 39 is disabled so that no data can be written to either one of the color buffer 38 and depth buffer 39 until the depth comparison circuit 33 supplies a logical value of 1 to the write enable inputs of the color buffer 38 or depth buffer 39 in accordance with the present invention.

The occlusion culling circuit 30, at step 45, compares the depths of each pixel of the graphics primitives defining the bounding volume to the already rendered primitives. At this step, the depth mask switch 37 is open so as to disable the storage of any z pixel data in the depth buffer 39, and the color mask circuit 36 is disabled so as to disable the storage of any color data in the color buffer 38. The z values for the incoming pixel data are supplied to the depth comparison circuit 33 and their associated x and y coordinates are supplied to the depth buffer 39 to address the current pixel data. The z value for each incoming pixel is compared against the current z value at the same x and y address in the depth buffer. If the incoming pixel does not pass the current depth comparison function, then the depth comparison circuit 33 will output a logical 0 which is fed to the OR circuit 34. If, on the other hand, the incoming pixel passes the current depth comparison function, then the depth comparison circuit 33 will output a logical 1 which is fed to the OR circuit 34. Due to the feedback from the depth compare result register 35 to the OR circuit 34, the value stored in the depth compare result register 35 will remain a logical value of 1 after the first occurrence of a pixel which is not occluded.

At step 46, after the z pixel values for the graphics primitives defining the entire bounding volume have been compared to the current z pixel values, the host computer 22 next reads the value stored in the depth compare result register 35. At step 47, the host computer 22 determines whether the value stored is a logical value of 1.

If the value stored in the register 35 has a logical value of 1, then this indicates that at least one pixel from the primitives defining the bounded volume passes the depth comparison function. Thus, at step 48, all the primitives enclosed by the bounded volume are rendered.

The step 48 represents the conventional process of comparing each pixel in the primitive to the current pixel at the same address and determining whether that pixel is visible. During step 48, the color mask circuit 36 passes the color data to the color buffer 38 and the depth switch 37 is closed so that the z depth values pass to the depth buffer 39. For each pixel that is visible, the output of the depth comparison circuit 33 has a logical value of 1 and is routed to the write enable inputs of the color and depth buffers 38 and 39 to permit the writing of the color data and depth data, respectively. After the data for each pixel in the incoming graphics primitive has been processed by the occlusion culling circuit 30, the method 40 repeats the process by returning to step 41 and clearing the result register 35 as indicated. Following step 48, at step 49, the host computer 22 renders the r, g, b and a or index color data and the z depth value for each visible pixel.

If, on the other hand, the value stored in the register 35 is not a logical value of 1, but rather, is a logical value of 0, then the host computer 22 determines at step 47 that every pixel from the primitives defining the bounded volume is occluded and that not a single pixel of the object would be visible. In such a situation, all primitives that are bounded (or enclosed) by the bounding volume may be trivially rejected and no further processing is required for any of them. Thus, the performance of the graphics computer 20 is enhanced by not having to render the primitives of an object that is completely occluded as determined by the occlusion culling circuit 30.

Thus, with the present invention, the speed of the graphics computer 20 can be significantly increased. Whereas previously the storage in the color and depth buffers 38 and 39 was enabled or disabled for each pixel in every graphics primitive. The present invention avoids this unnecessary processing time by quickly determining whether an entire group of graphics primitives would be occluded by the currently rendered primitives. The determination of a bounding volume for an incoming graphics primitive and the comparison of the graphics primitives defining the bounding volume to the currently rendered primitives can be performed much quicker than the conventional process of rendering each pixel in the incoming graphics primitives. The efficiency and speed of a graphics computer is therefore greatly improved.

The efficiency and speed of a graphics computer is also improved since the occlusion culling circuit 30 can determine whether an entire grouping of graphics primitives are occluded. In the example of the automobile, the graphics primitives may be grouped so that the body panels are the first group to be displayed. Before each pixel in each of the multitude of graphics primitives for the engine are processed, the host computer 22 can determine a bounding volume for the engine and pass this bounding volume through the occlusion culling circuit 30. If the value stored in the result register 35 is a logical 0, then the host computer 22 determines that the entire engine is occluded and that the engine need not be rendered. By avoiding a very complex graphics grouping of potentially thousands of primitives, the graphics computer 20 according to the invention can significantly decrease the amount of processing and thus greatly improve the speed and efficiency of the graphics computer 20.

The foregoing description of the preferred embodiments of the invention has been presented for purposes of illustration and description. It is not intended to be exhaustive or to limit the invention to the precise forms disclosed. Many modifications and variations are possible in light of the above teaching.

The embodiment was chosen and described in order to explain the principles of the invention and their practical application to thereby enable others skilled in the art to utilize the invention and various embodiments and with various modifications as are best suited to the particular use contemplated. It is intended that the scope of the invention be defined by the claims.

Wherefore, the following is claimed:

1. An occlusion culling system, comprising:
   a depth buffer configured to receive an enabling signal and to store a depth value of an incoming graphics primitive in response to said enabling signal;
   a color buffer configured to receive said enabling signal and to store color values of said incoming graphics primitive in response to said enabling signal; and
   a depth comparison circuit configured to compare said depth value of said incoming graphics primitive with a current depth value of a rendered pixel and to transmit said enabling signal when said depth value of said incoming graphics primitive passes said current depth value.

2. The system of claim 1, wherein said depth comparison circuit includes a logical OR function configured to receive said enabling signal as an input and configured to receive an output of said OR function as another input.

3. The system of claim 1, wherein said depth comparison circuit is configured to latch said enabling signal to a particular value when said depth value of said incoming graphics primitive passes said current depth value.

4. The system of claim 1, wherein said depth comparison circuit is configured to transmit a non-enabling signal until said depth value of said incoming graphics primitive passes said current depth value.

5. An occlusion culling system, comprising:
   means for receiving each primitive defining a bounded volume;
   means for comparing a depth value of each pixel associated with said primitives defining said bounded volume to a depth value of a respective rendered pixel;
   means for determining whether said each pixel is visible based on comparisons by said comparing means; and
   means for rendering said each primitive defining said bounded volume in response to a determination by said determining means that one of said pixels is visible.

6. The system of claim 5, further comprising a means for rendering color values associated with each visible pixel that is associated with said each primitive in response to said determination by said determining means.

7. The system of claim 5, further comprising a means for rejecting said primitives defining said bounded volume in response to a determination by said determining means that said each pixel is occluded.

8. A method for occlusion culling, comprising the steps of:
   receiving an incoming graphics primitive;
   comparing a depth value of said incoming graphics primitive with a current depth value for a rendered pixel;
   transmitting an enabling signal when said depth value of said incoming graphics primitive passes said current depth value; and
   storing said depth value and color values of said incoming graphics primitive in response to said enabling signal.

9. The method of claim 8, further comprising the step of latching said enabling signal when said depth value of said incoming graphics primitive passes said current depth value.

10. The method of claim 9, further comprising the step of transmitting a non-enabling signal until said depth value of said incoming graphics primitive passes said current depth value.

11. A method for occlusion culling, comprising the steps of:
    defining a bounded volume;
    receiving incoming primitives associated with said bounded volume;
    determining whether each pixel associated with said incoming primitives is occluded; and
    rejecting said incoming primitives in response to a determination that said each pixel associated with said incoming primitives is occluded.

12. The method of claim 11, further comprising the step of comparing a depth value from one of said pixels with a current depth value of a pixel being rendered by said graphics computer during said determining step.

13. The method of claim 11, further comprising the step of rendering pixel data associated with said incoming primitives when one of said pixels of one of said incoming primitives is determined to be visible.

14. The method of claim 12, further comprising the steps of:
    transmitting an enabling signal when said depth value from said one of said incoming primitives passes said current depth value; and
    storing pixel data associated with said one of said incoming primitives in response to said enabling signal.

15. The method of claim 14, further comprising the step of latching said enabling signal when said depth value from said one of said incoming primitives passes said current depth value.

16. A computer readable medium, comprising:
    comparison logic configured to compare a depth value of each incoming pixel defining a bounded volume to a depth value of a respective rendered pixel;
    logic configured to determine whether said each incoming pixel is visible based on comparisons by said comparison logic;
    logic configured to write color data and depth data of said each incoming pixel determined to be visible to a color buffer and a depth buffer, respectively; and
    logic configured to render said color data and said depth data.

17. The medium of claim 16, further comprising logic configured to reject said each incoming pixel in response to a determination that one of said incoming pixels defining said bounded volume is not visible.

* * * * *

UNITED STATES PATENT AND TRADEMARK OFFICE
CERTIFICATE OF CORRECTION

PATENT NO.    : 6,094,200
DATED         : July 25, 2000
INVENTOR(S)   : Olsen et al.

Page 1 of 1

It is certified that error appears in the above-identified patent and that said Letters Patent is hereby corrected as shown below:

<u>Title page,</u>
Insert Item:
-- Related U.S. Application Data
[63]  Continuation of application No. 08/690,433; filed July 26, 1996 --

Signed and Sealed this

Twenty-eighth Day of September, 2004

JON W. DUDAS
*Director of the United States Patent and Trademark Office*